Oct. 16, 1934.  G. J. DEHN  1,977,305
GREASE TRAP
Filed April 6, 1932  2 Sheets-Sheet 1

Inventor
GEORGE J. DEHN.
By Fred Gerlach
his Atty.

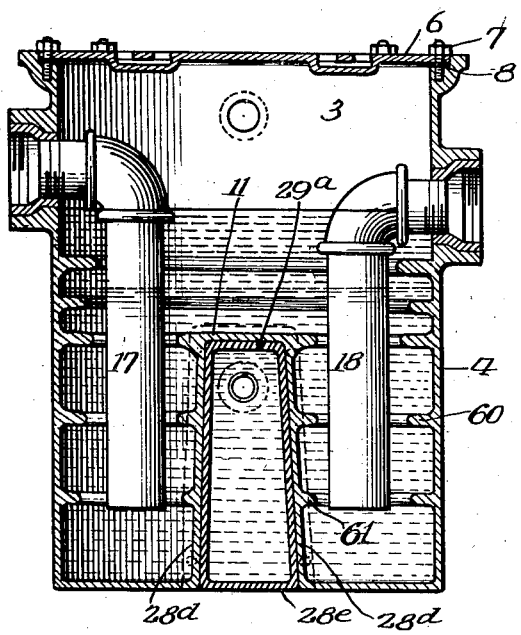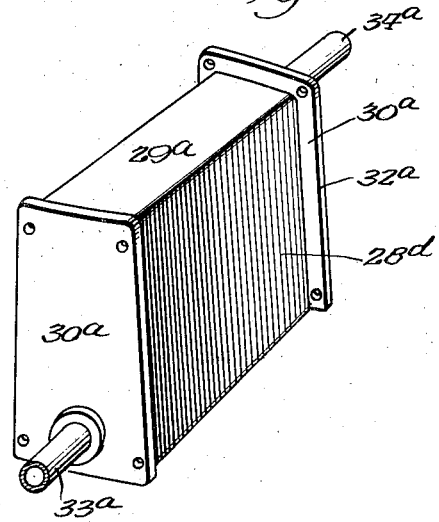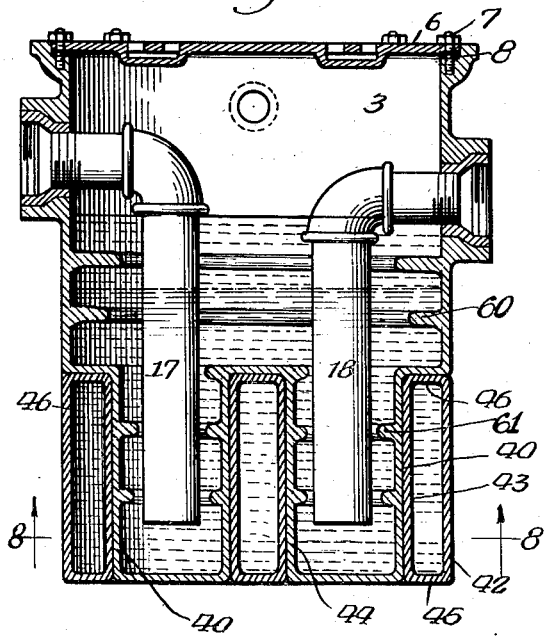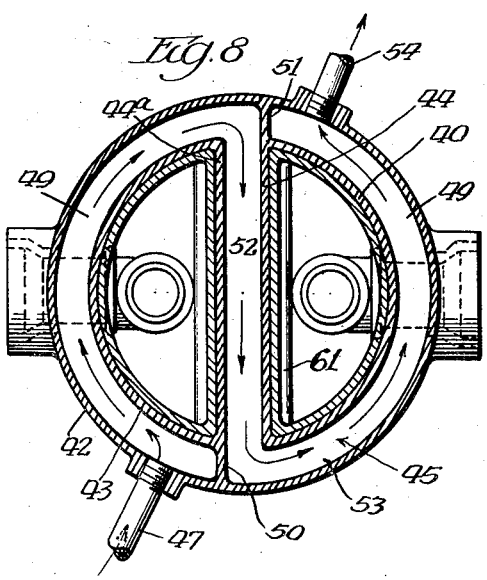

Patented Oct. 16, 1934

1,977,305

UNITED STATES PATENT OFFICE 1,977,305

GREASE TRAP

George J. Dehn, Chicago, Ill.

Application April 6, 1932, Serial No. 603,567

10 Claims. (Cl. 182—9)

The invention relates to traps which are connected to receive drainage containing greases for the purpose of separating, congealing and accumulating the grease from the drainage.

Heretofore traps for this purpose have been provided with water jackets for cooling the drainage to congeal the grease. In these prior constructions, the water jacket has either been integrally formed with the receptacle or basin into which the drainage was discharged, or separately formed from the basin and placed inside thereof. In these cooled traps, it is desirable to utilize the water as it comes from the source of supply and in transit to the place of consumption or use.

In these prior constructions, when a leak occurred in the walls or connections between the water jacket and the basin, the drainage could, through the leak, enter the water flowing through the jacket, and thus contaminate the water passing to the point of use. The primary object of the present invention is to provide a construction of water cooled grease trap in which any leaks in the water jacket or in the wall of the basin will not cause the drainage to mix with or contaminate the water. Any such contamination renders the water unfit for the desired use or consumption. Another object is to provide improved means for separating the grease from the drainage and retarding its flow so it will be retained in the trap.

Other objects of the invention will appear from the detailed description.

The invention consists in the several novel features hereinafter set forth and more particularly defined by claims at the conclusion hereof.

Figure 1:
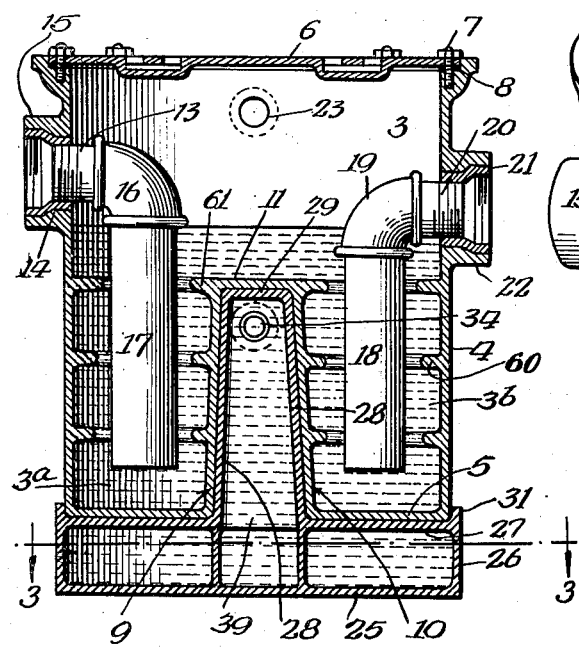
Figure 2:
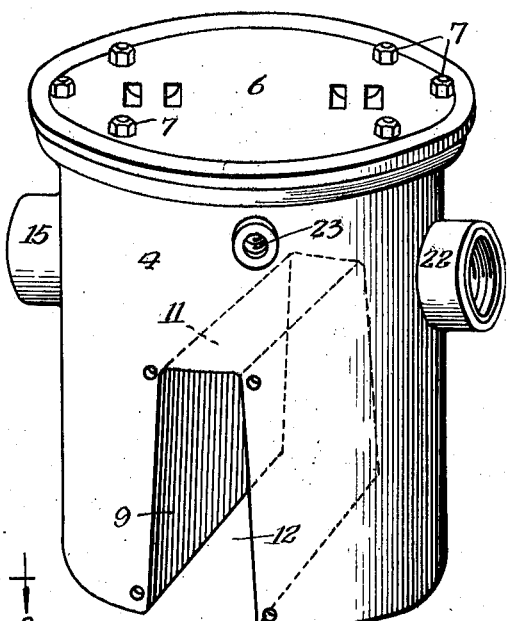
Figure 3:
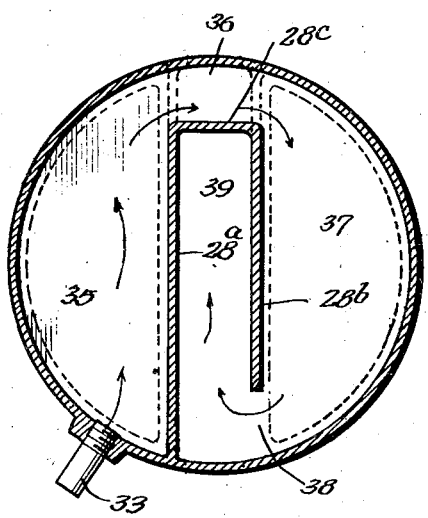
Figure 4:
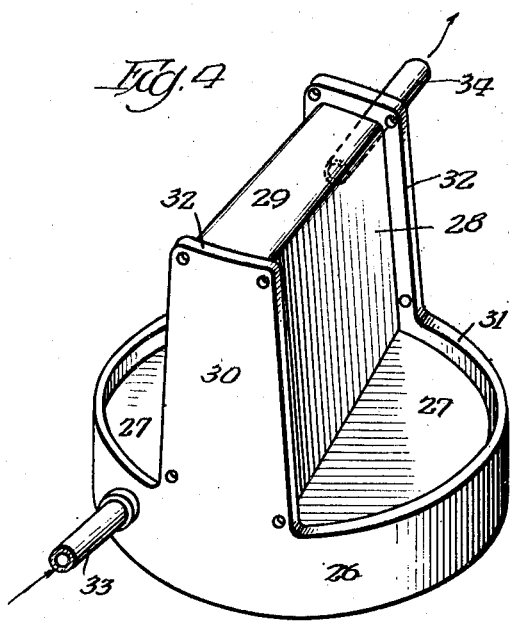

In the drawings: Fig. 1 is a vertical section of a grease trap embodying one form of the invention. Fig. 2 is a perspective of the basin of the trap illustrated in Fig. 1. Fig. 3 is a section on line 3—3 of Fig. 1. Fig. 4 is a perspective of the water jacket forming a part of the trap illustrated in Fig. 1. Fig. 5 is a vertical section of a grease trap embodying the modified form of the invention. Fig. 6 is a perspective of the water jacket used in the trap of Fig. 5. Fig. 7 is a vertical section of another modified form of the invention. Fig. 8 is a section on line 8—8 of Fig. 7.

In Figs. 1 to 4, the invention is exemplified in a trap comprising a receptacle or basin 3 which has a cylindrical wall 4, an integral bottom wall 5, and a top cover 6, which is removably secured by bolts 7 to the top of the basin. A packing 8 is interposed between the cover 6 and its seat in the top of wall 4. A transverse bridge is provided in the lower portion of the basin to form a baffle over which the drainage must flow in passing from the inlet to the outlets, and this bridge consists of vertically extending and downwardly divergent side walls 9 and 10 and a top or connecting wall 11, all of which are integrally formed with the cylindrical wall 4 and bottom wall 5 of the basin. The space 12 between the walls 9 and 10 of the bridge extends completely through and across the basin.

The space $3^a$ in the basin at one side of the bridge is adapted to receive drainage through a connection comprising an inlet nipple 13 which is screw-threaded into the bushing 14 which is secured in a boss 15 formed in the wall 4, an elbow 16 into which the nipple 13 is screwed, and a pipe 17 which is screw-threaded into the elbow and extends downwardly therefrom to discharge the drainage into the space $3^a$ adjacent the bottom 5 of the basin 3.

An outlet connection for the drainage, after it has passed over the bridge in the basin, comprises a vertical pipe 18, the lower end of which is open to receive drainage from the lower portion of space $3^b$ at the other side of the bridge, an elbow 19, to which the upper end of pipe 18 is connected, and a nipple 20 screw threaded into a bushing 21 which is secured in a boss 22 projecting from the side of the basin wall 4. A vent opening 23 is formed in the upper portion of the basin wall 4.

The improved cooling means, as exemplified in Figs. 1 to 4, consists of a hollow structure or jacket which is adapted to be placed on and to contact with the outside of the basin, so that in event that a leak develops in the basin, the drainage cannot commingle with the water flowing through the jacket. This jacket comprises a hollow cylindrical base portion adapted to underlie the basin, having a wall to contact with the bottom wall 5 of the basin, and a vertical extension which is adapted to fit into the bridge in the basin. The hollow base of the jacket is formed by a bottom wall 25, a circumferential cylindrical wall 26, and a top wall 27. The top wall 27 contacts with the bottom wall 5 of the basin, so heat will be transferred from the basin to the jacket. The vertical extension of the jacket comprises side walls 28 adapted to fit against and contact with the walls 9 and 10 of the bridge in the basin, a top wall 29 adapted to contact with the top wall 11 of the bridge, and end walls 30. All of the walls of the jacket are preferably cast together. A flange 31 extends upwardly from the top wall 27 to fit around the basin wall 4. Flanges 32 project from the end walls 30 of the vertical extension to lap the basin wall 4, so that the jacket can be secured in the basin by screws extending through holes in said flanges and into the wall 4 of the basin. An inlet pipe 33 is screw-threaded into the wall 26 of the water jacket to deliver water for cooling to the jacket. A pipe 34 is screw threaded into one end of the end walls 30 of the vertical extension of the jacket, to conduct the water to the place of consumption or use after it has passed through the jacket. To effectively cool the drainage, it is desirable to direct the water to flow successively through all portions of the jacket, and for this purpose, one of the side walls 28 of the vertical extension of the water jacket is extended, as at 28$^a$, between the top and bottom walls 27 and 25 of the lower portion of the jacket, and the opposite wall 28 is extended, as at 28$^b$, between said walls 25 and 27. A cross-wall 28$^c$ connects walls 28$^a$ and 28$^b$ below the top wall 27 to form a passage 36 between the spaces 35 and 37 in the base of the jacket. Wall 28$^a$ confines the cooling water entering the pipe 33 to the space 35 at one side of the lower portion of the jacket. Wall 28$^c$ forms with bottom wall 25 and top wall 27 a channel 36 through which the water from space 35 will flow to the space 37 at the other side of the lower portion of the base of the jacket. Wall 28$^b$ terminates short of the circumferential wall 26 to form a passage 38 through which the water will flow from the space 37 into the space 39 in the central portion of the base, the top of which is open to the passage 38 in the vertical extension of the jacket. This construction causes the water entering the pipe 33 to flow successively through the chamber 35 at one side of the base of the jacket, passage 36, space 37 at the other side of the base, passage 38, chamber 39 to the outlet pipe 34. As the water flows through the space 35 in the base of the jacket, the space 3$^a$, into which the drainage is delivered by pipe 17, will be cooled, and as the water flows through space 37 the drainage in the space 3$^b$ of the basin will be cooled. As the water flows upwardly through and across the chamber 39 in the vertical extension of the jacket and to the outlet pipe 34, the walls of the bridge in the basin will be cooled. This construction constitutes a water jacket with passages whereby the water will be caused to circulate successively through the side portions of the base of the jacket and thence upwardly through the chamber in the vertical extension of the jacket which cools the bridge in the basin. This results in efficiently cooling the drainage passing through the basin and over the baffle, so that the grease therein will be congealed and trapped in the upper portion of the basin. This construction also exemplifies a water jacket which is separately formed from the basin and is disposed entirely on the outside of the basin, so that in the event of a leakage in the wall of the basin, it will be impossible for the drainage to pass into the water jacket to contaminate the water flowing therethrough. When the cooling jacket is disposed inside of the basin, the leak in or fracture of the cooling jacket would make it possible for the drainage to pass into the jacket. By providing a jacket separate from and outside of the basin, a leak either in the basin walls or in the walls of the jacket will not result in mixing the drainage with the water flowing through the jacket.

In the form of the invention illustrated in Figs. 5 and 6, the basin, inlet and outlet connections, and the hollow bridge for baffling the drainage are of the construction illustrated in Figs. 1 and 2. The cooling jacket, however, is of such a form as to extend into the hollow bridge and has no base underlying the basin. The jacket comprises a top wall 29$^a$ fitting against the top wall 11 of the bridge, downwardly divergent side walls 28$^d$ which contact with the side walls 9 and 10 of the bridge in the basin, a bottom wall 28$^e$ and end walls 30$^a$. A water inlet pipe 33$^a$ is connected to one end adjacent the lower portion of the jacket and a discharge pipe 34$^a$ leads from the upper portion of the opposite end. Flanges 32$^a$ are provided through which screws pass to secure the jacket in the bridge in the basin.

In the form of the invention illustrated in Figs. 7 and 8, the lower portion of the basin is formed with an annular inset portion 40 and a transverse hollow bridge 41. The jacket comprises a cylindrical outer wall 42 substantially flush with the outer cylindrical wall of the basin; an inner cylindrical wall 43 which contacts with the outer wall of the basin within the inset 40; cross walls 44 and 44$^a$ contacting with the side walls of the bridge 41 in the basin, a bottom wall 45, and a top wall 46, which contacts with the inset wall 40 of the basin. All of these walls are integrally formed. An inlet pipe 47 for water is connected to the outer wall 42 of the jacket. Adjacent said pipe, cross-wall 40$^a$ is extended, as at 50, between walls 43 and 42, so that the water will flow through semi-circular chamber 49 to cool one side of the basin. The cross-wall 44 is extended, as at 51, to direct the water from the semi-circular chamber 49 into one end of the cross-chamber 52 formed between the walls 44, 44$^a$. From said cross-chamber, the water flows through a semi-circular chamber 53 around the other side of the basin and escapes through an outlet 54. This exemplifies another construction in which the cooling jacket is outside of the basin; and in which the jacket is provided with walls for conducting the water successively through a semi-circular chamber extending around one side of the basin, then through a conduit in the bridge, and thence through a semi-circular chamber which extends around the other side of the basin.

In each form of the invention, the side-wall of the basin is formed with a vertical series of inwardly extending ribs 60, and the inner faces of the side walls of the bridge are formed with inwardly projecting ribs 61. These ribs are effective in separating the grease from the drainage and retarding the flow of the grease so it will rise to and accumulate in the upper portion of the basin.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a trap for congealing grease from drainage, the combination of a basin having a hollow bridge forming a baffle, inlet and outlet connections for the drainage, a cooling jacket, and means for circulating water through the jacket, said jacket comprising means for cooling the bridge and having its walls separately formed from and contacting with the outside face of the basin, so that in the event of a leak or rupture in the basin, the drainage and the water flowing through the jacket cannot mix.

2. In a trap for congealing grease from drainage, the combination of a basin having a hollow bridge forming a baffle across the lower portion of the basin, inlet and outlet connections for the drainage, a cooling jacket, and means for circulating water through the jacket, said jacket having its walls separately formed from the basin, and fitting in, and contacting with, the outside face of the wall of the bridge.

3. In a trap for congealing grease from drainage, the combination of a basin having a hollow bridge forming a baffle across the lower portion of the basin, inlet and outlet connections for the drainage, a cooling jacket, and means for circulating water through the jacket, said jacket having its walls separately formed from, and being disposed outside of, the basin, and having walls contacting with the face of the bridge wall.

4. In a trap for congealing grease from drainage, the combination of a basin having a hollow bridge forming a baffle across the lower portion of the basin, inlet and outlet connections for the drainage, a cooling jacket, and means for circulating water through the jacket, said jacket being formed separately from the basin and on the outside thereof and comprising a base having walls contacting with the outside face of the lower portion of the basin.

5. In a trap for congealing grease from drainage, the combination of a basin having a hollow bridge forming a baffle across the lower portion of the basin, inlet and outlet connections for the drainage, a cooling jacket, and means for circulating water through the jacket, said jacket being formed separately from the basin and on the outside thereof and comprising a base having walls contacting with the outside face of the lower portion of the basin, and the outside face of the wall of the bridge.

6. In a trap for congealing grease from drainage, the combination of a basin having a hollow bridge forming a baffle across the lower portion of the basin, inlet and outlet connnections for the drainage, a cooling jacket, and means for circulating water through the jacket, said jacket being formed separately from the basin and on the outside thereof and comprising a base having walls contacting with the outside face of the lower portion of the basin, and a hollow extension contacting with the outside face of the wall forming the bridge.

7. In a trap for congealing grease from drainage, the combination of a basin having a hollow bridge forming a baffle across the lower portion of the basin, inlet and outlet connections for the drainage, a cooling jacket, comprising a base under the basin and an extension in the bridge, and means for circulating water through the jacket and directing it to flow successively through the base and the extension.

8. In a trap for congealing grease from drainage, the combination of a basin having a hollow bridge forming a baffle across the lower portion of the basin, inlet and outlet connections for the drainage, a cooling-jacket formed separately from the basin and on the outside thereof comprising a base having a wall contacting with the outer face of the lower portion of the basin and an extension having walls contacting with the outside face of the bridge-wall, and means for circulating water through the jacket and directing it successively through the base and through the extension in the bridge.

9. In a trap for congealing grease from drainage, the combination of a basin having a hollow bridge forming a baffle across the lower portion of the basin, inlet and outlet connections for the drainage, a cooling jacket formed separately from the basin and on the outside thereof and comprising a base having walls contacting with the outside face of the lower portion of the basin and an extension having walls contacting with the outside face of the wall of the bridge, and means for circulating water through the jacket and directing it successively around the sides of the base and through the extension in the bridge.

10. In a trap for congealing grease from drainage, the combination of a basin, inlet and outlet connections on opposite sides of the basin for circulating the drainage through said basin, a bridge extending across the lower portion of the basin and arranged with respect to the two connections so as to cause the drainage to flow upwardly in the inlet side of the basin and then over the bridge and downwardly in the outlet side of the basin, and inwardly extending ribs on the side wall of the basin and outwardly extending ribs on the sides of the bridge for baffling the drainage for grease separation purposes in the inlet side of the basin and for preventing or retarding the grease from flowing downwardly in the outlet side of the basin.

GEORGE J. DEHN.